(12) United States Patent
Sato

(10) Patent No.: US 10,996,672 B2
(45) Date of Patent: *May 4, 2021

(54) DRIVING CONTROL APPARATUS FOR VEHICLE

(71) Applicant: Suzuki Motor Corporation, Hamamatsu (JP)

(72) Inventor: Katsuhiko Sato, Hamamatsu (JP)

(73) Assignee: SUZUKI MOTOR CORPORATION

( * ) Notice: Subject to any disclaimer, the term of this patent is extended or adjusted under 35 U.S.C. 154(b) by 123 days.

This patent is subject to a terminal disclaimer.

(21) Appl. No.: 16/253,704

(22) Filed: Jan. 22, 2019

(65) Prior Publication Data

US 2019/0227546 A1    Jul. 25, 2019

(30) Foreign Application Priority Data

Jan. 24, 2018   (JP) .............................. JP2018-009698

(51) Int. Cl.
   *G05D 1/00*       (2006.01)
   *B60W 30/12*      (2020.01)
   (Continued)

(52) U.S. Cl.
   CPC ........... *G05D 1/0061* (2013.01); *B60W 30/12* (2013.01); *B60W 30/18163* (2013.01); *B60W 50/14* (2013.01); *B60W 10/04* (2013.01); *B60W 10/18* (2013.01); *B60W 10/20* (2013.01); *B60W 30/143* (2013.01); *B60W 40/06* (2013.01); *B60W 40/09* (2013.01); *B60W 50/082* (2013.01);
   (Continued)

(58) Field of Classification Search
   None
   See application file for complete search history.

(56) References Cited

U.S. PATENT DOCUMENTS 9,308,914 B1 *   4/2016  Sun ........................ B60K 28/06
2011/0241862 A1 * 10/2011  Debouk .............. B60W 50/035
                                                              340/439

(Continued)

FOREIGN PATENT DOCUMENTS

JP            201688383 A    5/2016

*Primary Examiner* — Redhwan K Mawari
*Assistant Examiner* — Melanie J Patrick
(74) *Attorney, Agent, or Firm* — Lerner, David, Littenberg, Krumholz & Mentlik, LLP

(57) ABSTRACT

A driving control apparatus for a vehicle is provided with an environmental condition estimating part including: a surrounding recognizing function that recognizes the vehicle's driving lane; and another vehicle driving on the driving lane; and a function that obtains the vehicle's moving state, a path generating part that generates a target path based on information obtained by the environmental condition estimating part, and a vehicle control part that performs speed control and steering control for causing the vehicle to follow the target path, and configured to be capable of executing an ACC function that performs a constant speed drive or a following drive, an LKA function that keeps the driving within the vehicle's driving lane, an override function that stops the ACC function by operation intervention of a driver, and a function that performs fallback control of the ACC function, the apparatus being configured to alter an ACC override threshold.

3 Claims, 6 Drawing Sheets

(51) Int. Cl.
*B60W 50/029* (2012.01)
*B60W 30/18* (2012.01)
*B60W 50/14* (2020.01)
*B60W 10/20* (2006.01)
*B60W 10/18* (2012.01)
*B60W 30/14* (2006.01)
*B60W 40/06* (2012.01)
*B60W 40/09* (2012.01)
*B60W 50/08* (2020.01)
*B60W 50/00* (2006.01)
*B60W 10/04* (2006.01)

(52) U.S. Cl.
CPC ... *B60W 2050/007* (2013.01); *B60W 2420/42* (2013.01); *B60W 2420/52* (2013.01)

(56) References Cited

U.S. PATENT DOCUMENTS

| | | | |
|---|---|---|---|
| 2016/0114812 A1* | 4/2016 | Maruyama | B60K 28/06 |
| 2016/0132055 A1 | 5/2016 | Matsuno et al. | |
| 2016/0207537 A1* | 7/2016 | Urano | B60W 50/035 |
| | | | 340/439 |
| 2018/0023951 A1* | 1/2018 | Seo | G01B 11/275 |
| | | | 356/138 |

* cited by examiner

DRIVING CONTROL APPARATUS FOR VEHICLE

CROSS-REFERENCE TO RELATED APPLICATIONS

This application claims the benefit of the filing date of Japanese Patent Application No. 2018-009698, filed on Jan. 24, 2018, the disclosure of which is hereby incorporated herein by reference.

TECHNICAL FIELD

The present invention relates to a driving control apparatus for a vehicle, and more particularly, relates to an override function in a partially automated in-lane driving system.

BACKGROUND ART

Various techniques aimed at load reduction and safety driving assistance for drivers, for example, an adaptive cruise control system (ACCS) and a lane keeping assistance system (LKAS) have been put into practical use. Further, practical use or international standardization of a partially automated in-lane driving system (PADS) based on these systems is in progress.

Such a driving control system is provided with an override function of switching the automated driving for manual driving by forced intervention of a driver during the operating. For example, JP 2016-088383A discloses a technique in which when characteristics of a steering angle detected by a steering angle detecting means and a lateral force detected by a lateral force detecting means differ from reference characteristics in a case in which a steering wheel is in a non-load state, a steering intervention by a driver is determined to be made.

SUMMARY OF THE INVENTION

Problem to be Solved by the Invention

JP 2016-088383A does not have a particular description regarding an override by an accelerator pedal operation or a brake pedal operation of a driver at a function failure time of a steering system, that is, regarding operation intervention of an acceleration/deceleration control system, but due to the override by the operation intervention of the acceleration/deceleration control system, a rapid deceleration behavior or a rapid acceleration behavior possibly occurs in a vehicle.

For example, in a case in which a function failure occurs in the LKAS caused by a failure of an external sensor, EPS controller abnormality or the like during the operating of the partially automated in-lane driving function, the LKA function stops at the same time with the failure occurrence and the ACCS transitions to a fallback control mode. At this moment, first, an ACC function stop and an operation takeover request are notified to a driver and an ACC fallback control is started after several seconds elapse. At a point at which a target speed reaches a predetermined value and a target deceleration rate becomes 0 m/s², the ACC function is stopped and the accelerator pedal operation and the brake pedal operation are taken over by the driver.

However, when the LKA function stop, the ACC function stop, and the operation takeover request are notified to the driver, the driver having panicked at the function failure notification possibly performs the override (ACC override) by an excessive brake pedal operation or an excessive accelerator pedal operation.

For example, as illustrated in FIG. 5, the driver having panicked at the LKA function stop and the ACC takeover request notification performs excessive brake pedal operation (brake pedal override of the ACC), whereby a vehicle 3 driving at the rear possibly approaches vehicle 1' and rapidly decelerates.

In addition, as illustrated in FIG. 6(*a*), at the right automated steering for keeping in a lane, the driver having panicked at the LKA function stop and the ACC takeover request notification performs excessive accelerator pedal operation (accelerator pedal override of the ACC), whereby a rapidly accelerating vehicle 1' possibly approaches in a neighboring lane 52.

Further, as illustrated in FIG. 6(*b*), at the left automated steering for keeping in a lane, a driver having panicked at the LKA function stop and the ACC takeover request notification performs excessive accelerator pedal operation (accelerator pedal override of the ACC), whereby a rapidly accelerating vehicle 1' possibly approaches a side strip, a side wall, a median zone or the like.

The present invention is made in view of actual problems, and has an object of providing a driving control apparatus for a vehicle that can prevent a rapid deceleration behavior or a rapid acceleration behavior caused by an excessive operation override in a transition process to an ACC fallback control at an LKA function failure time.

Means for Solving the Problem

For solving the problems, the present invention provides a driving control apparatus for a vehicle, comprising:

- an environmental condition estimating part including a surrounding recognizing function that recognizes the vehicle's own driving lane and another vehicle driving in the driving lane and a function that obtains the vehicle's own driving state;
- a path generating part that generates a target path based on information obtained by the environmental condition estimating part; and
- a vehicle control part that performs speed control and steering control for causing an own vehicle to follow the target path, and configured to be capable of executing:
  - an ACC function that performs a constant speed drive in accordance with a target speed in a case in which a preceding other vehicle is not present in the vehicle's own driving lane and performs a following drive while keeping a predetermined inter-vehicle distance in a case in which a vehicle is present ahead;
  - an LKA function that keeps the driving within the vehicle's own driving lane by the following control to the target path;
  - an override function that stops the ACC function by operation intervention of a driver; and
  - a function that performs fallback control of the ACC function by notifying stop of the ACC function and an operation takeover to a driver at a failure time of the LKA function, wherein the apparatus is further configured to alter an ACC override threshold as a determination reference of the operation intervention stopping the ACC function to a value greater than at a normal operation time of the LKA function, at the failure time of the LKA function.

Advantageous Effect of the Invention

According to the driving control apparatus for the vehicle in the present invention, while the function stop and the operation takeover are notified at the LKA function failure time and the fallback control of the ACC function is performed, the ACC override threshold is altered to a value greater than at the normal operation time. Therefore even when the driver having panicked at the LKA and ACC function stop, and the operation takeover notification performs the excessive brake pedal operation or the excessive accelerator pedal operation, it is possible to transition to the fallback control in a state in which the override is avoided and the ACC function continues. Therefore it is possible to prevent the ACC override by the excessive operation and confusion of a traffic flow such as a rapid approach to the other vehicle and a rapid lane change due to the ACC override, providing an advantage in smooth operation takeover.

DETAILED DESCRIPTION

Mode for Carrying Out the Invention

Hereinafter, an explanation will be given in detail of embodiments of the present invention with reference to the drawings.

Figure 1:
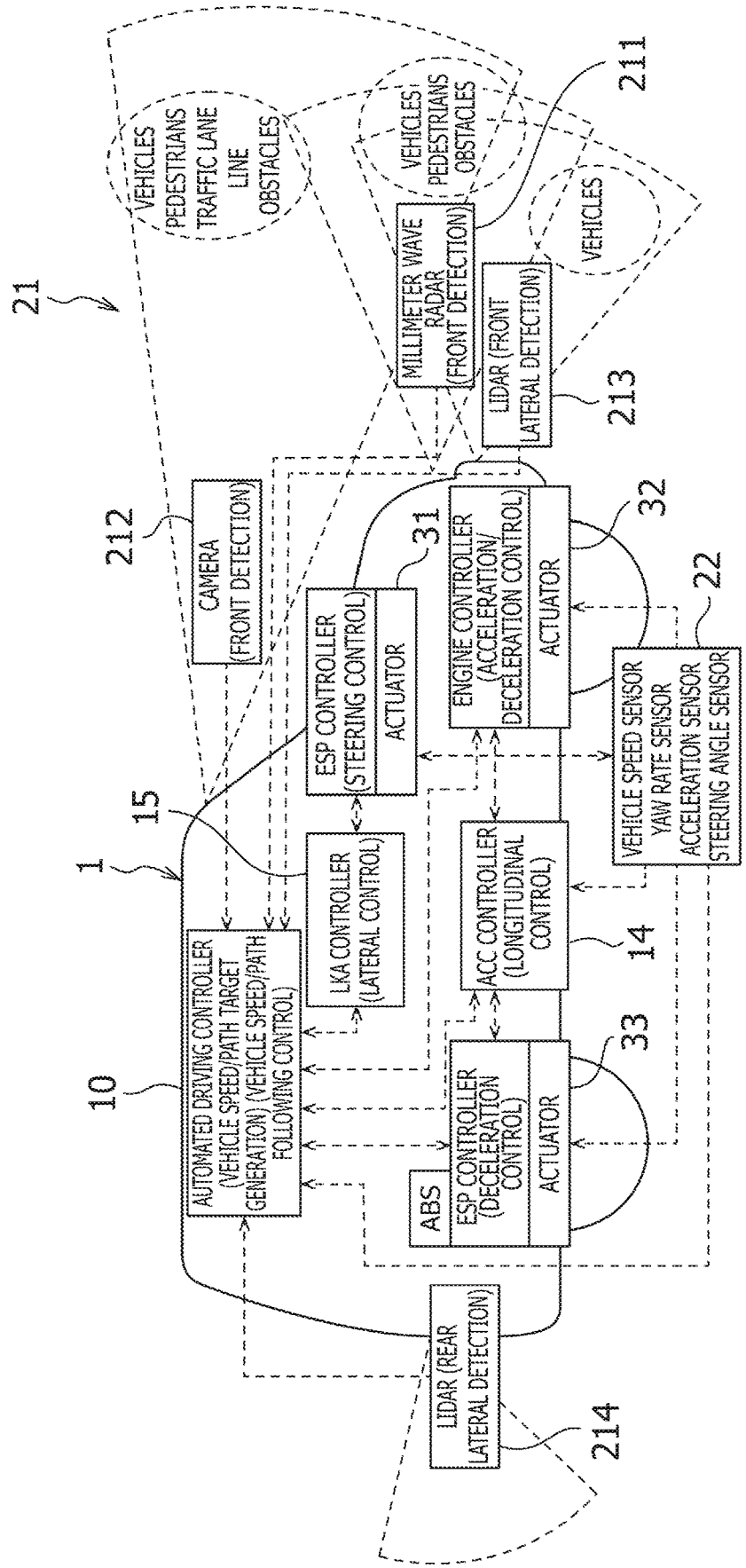
FIG. 1 is a schematic diagram illustrating a driving control system for a vehicle.

In FIG. 1, a vehicle 1 provided with a driving control system for a vehicle according to the present invention is provided with components of a general automobile, such as an engine and a vehicle body, and further, for performing recognitions, determinations and operations, which are conventionally performed by a driver, in a vehicle side, an external sensor 21 for detecting a vehicular surrounding environment, an internal sensor 22 for detecting vehicle information, a controller and actuator group for speed control and steering control, an ACC controller 14 for inter-vehicle distance control, an LKA controller 15 for lane keeping assistance control, and an automated driving controller 10 for integrating them to perform path following control.

The controller and actuator group for the speed control and the steering control includes an EPS (electric power steering) controller 31 for the steering control, an engine controller 32 for acceleration/deceleration control, and an ESP/ABS controller 33. The ESP (registered trademark; electronic stability program) integrates the ABS (antilock brake system) to configure a stability control system (vehicle behavior stability control system).

The external sensor 21 includes a plurality of detecting means for inputting to the automated driving controller 10 relative distances to traffic lane lines 5s, 5c on a road defining an own vehicle 51 and a vehicle lane 52 neighbored thereto, and presences of other vehicles, obstacles, persons and the like present in the surroundings of the own vehicle, as image data or point cloud data.

Figure 2:
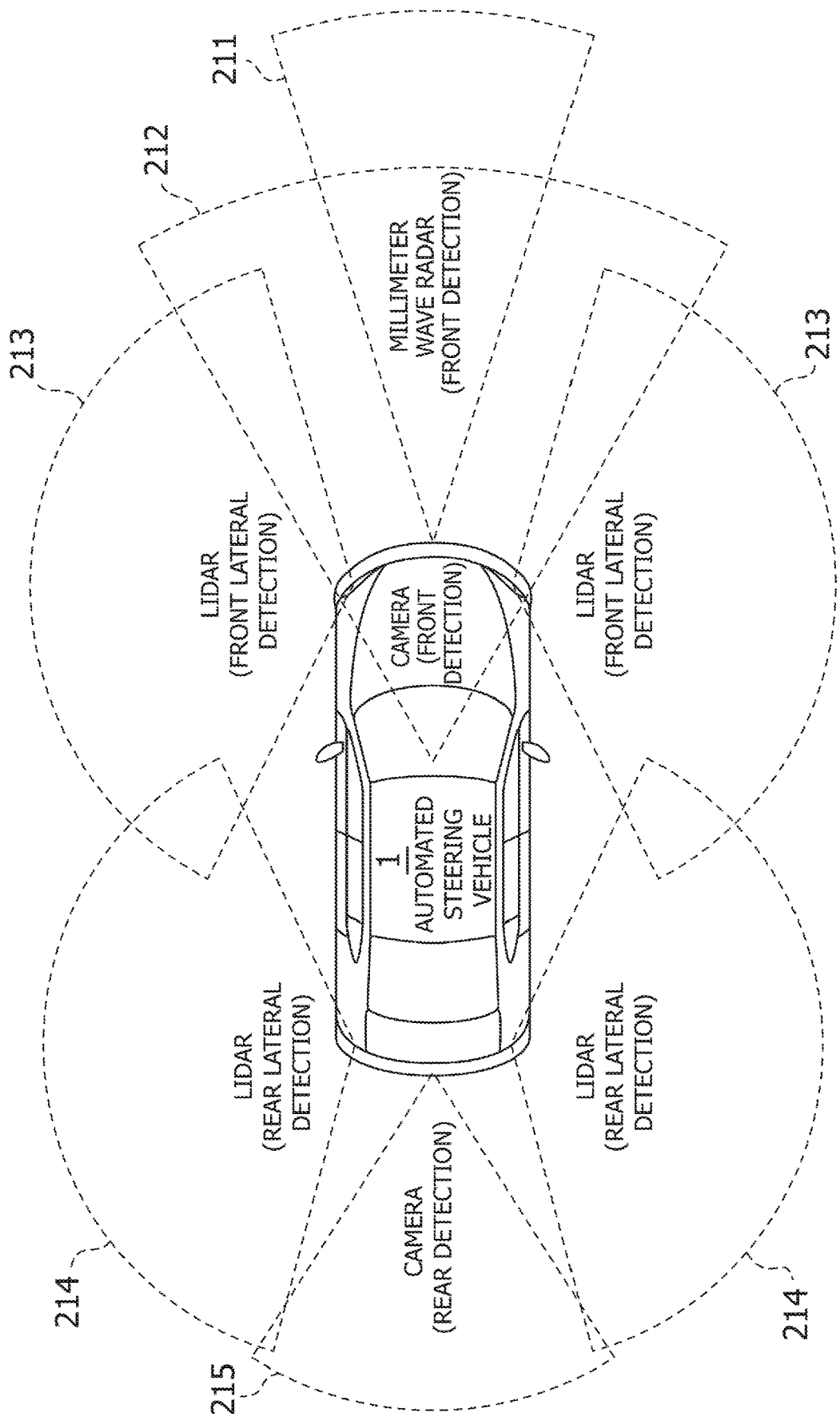
FIG. 2 is a schematic plan view illustrating an external sensor group for a vehicle.

For example, as illustrated in FIG. 2, the vehicle 1 is provided with a millimeter wave radar (211) and a camera (212) as front detecting means 211, 212, an LIDAR (laser image detection/ranging) as front lateral detecting means 213 and rear lateral detecting means 214, and a camera (back camera) as rear detecting means 215, making it possible to cover 360 degrees in the surroundings of the vehicle itself to detect positions and distances of vehicles, obstacles and the like, and a traffic lane position within a predetermined distance from the vehicle itself in the front, rear, left and right directions.

Figure 3:
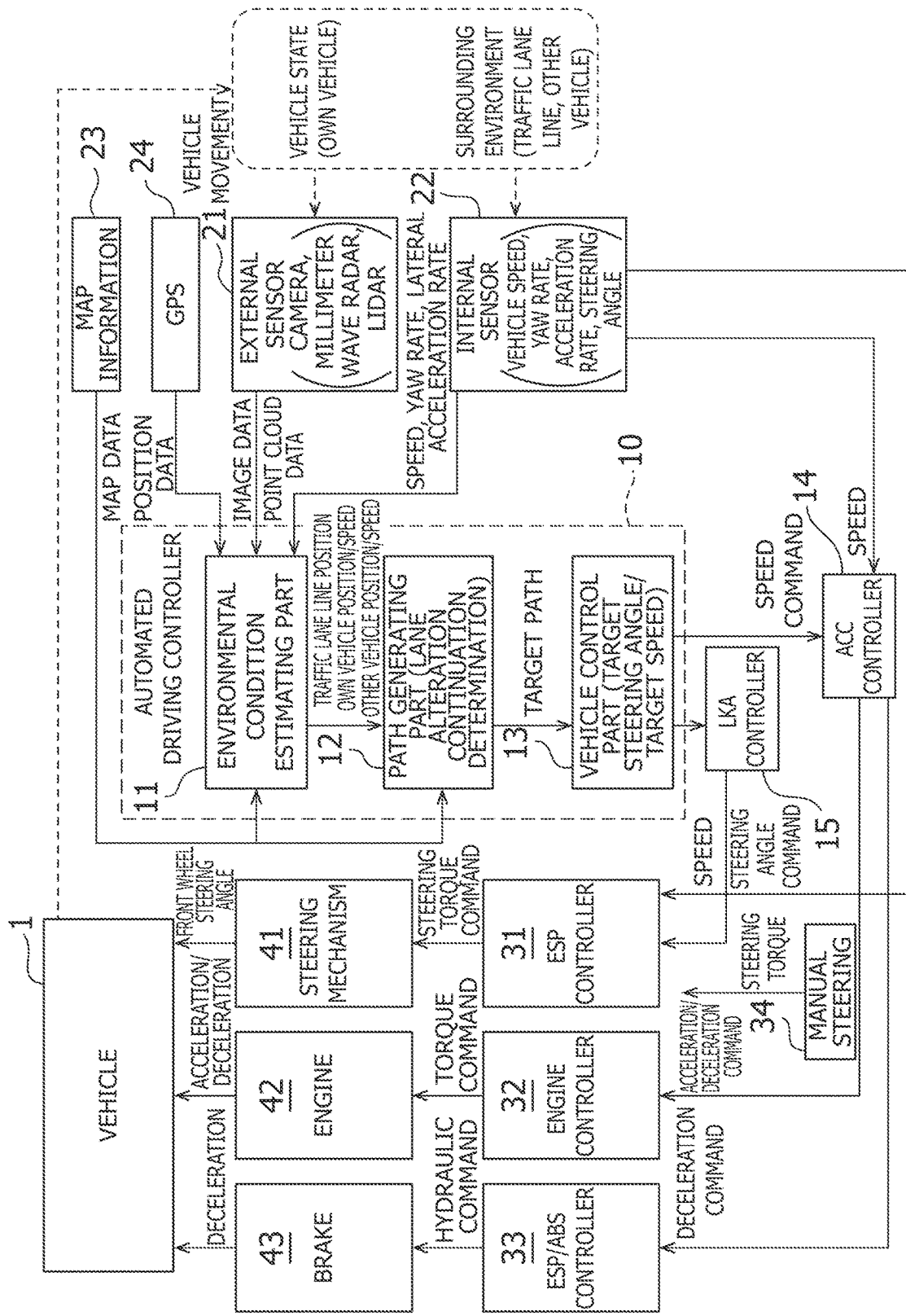
FIG. 3 is a block diagram illustrating the driving control system for the vehicle.

The internal sensor 22 includes a plurality of detecting means that measures a physical amount representing a movement state of a vehicle, such as a vehicle speed sensor, a yaw rate sensor and an acceleration sensor, and as illustrated in FIG. 3, the respective measured values are input to the automated driving controller 10, the ACC controller 14, the LKA controller 15 and the EPS controller 31.

The automated driving controller 10 includes an environmental condition estimating part 11, a path generating part 12 and a vehicle control part 13, and is formed of a computer for executing functions as described below, that is, a ROM storing programs and data, a CPU executing calculation processing, a RAM reading out the programs and the data to store the kinetic data and calculation processing results, input/output interfaces, and the like.

The environmental condition estimating part 11 obtains an absolute position of a vehicle itself by using positioning means 24 of a GPS or the like and estimates traffic lane line positions in its own lane 51 and the neighboring lane 52, other vehicle positions and speeds based on external data of image data, point cloud data and the like obtained by the external sensor 21. In addition, the movement state of the vehicle itself is obtained from internal data measured by the internal sensor 22.

The path generating part 12 generates a target path from the vehicle's own position estimated by the environmental condition estimating part 11 to an arrival target. In addition, the path generating part 12, by referring to map information 23, generates a target path from the vehicle's own position in a lane change to an arrival target spot based on the traffic lane line position of the neighboring lane, the other vehicle position and speed estimated by the environmental condition estimating part 11, and the movement state of the own vehicle.

The vehicle control part 13 calculates a target speed and a target steering angle based on the target path generated by the path generating part 12, sends a speed command for a constant speed drive or inter vehicle distance keeping/following drive to the ACC controller 14, and sends a steering angle command for path following to the EPS controller 31 via the LKA controller 15.

Note that the vehicle speed is also input to the EPS controller 31 and the ACC controller 14. Since steering torque changes by the vehicle speed, the EPS controller 31 refers to a steering angle-steering torque map for each vehicle speed to send a torque command to a steering mechanism 41. Movements in a longitudinal direction and a lateral direction of the vehicle 1 are controlled by controlling an engine 42, a brake 43 and the steering mechanism 41 by the engine controller 32, the ESP/ABS controller 33 and the EPS controller 31.

Outline of Partially Automated in-Lane Driving System

Next, an outline of a partially automated in-lane driving system (PADS) will be explained on the assumption of traveling within a single lane while following a preceding vehicle on a highway.

The partially automated in-lane drive (PADS drive) is made executable in a state in which the ACC controller 14 configuring the ACCS and the LKA controller 15 configuring the LKAS together with the automated driving controller 10 are both operating.

The automated driving controller 10 (path generating part 12), at the same time with an operation of the partially automated in-lane driving system, generates a target path and a target speed within a single lane based on external information (lanes, a vehicle's position, a vehicle's driving lane, and positions and speeds of other vehicles in the middle of driving in the vehicle's driving lane and the neighboring lane) obtained in the environmental condition estimating part 11 through the external sensor 21 and internal information (vehicle speeds, yaw rates and acceleration rates) obtained in the internal sensor 22.

The automated driving controller 10 (vehicle control part 13) estimates a speed, a posture, a lateral displacement of a vehicle after $\Delta t$ seconds from a relation of a yaw rate y and a lateral acceleration rate ($d^2y/dt^2$) generated by a vehicle movement, by a vehicle's own position and movement characteristics of the vehicle itself, that is, a front wheel steering angle $\delta$ generated at the time of giving steering torque T to the steering mechanism 41 in the middle of traveling at a vehicle speed V, and gives a steering command for causing the lateral displacement to be yt after $\Delta t$ seconds to the EPS controller 31 via the LKA controller 15 and gives a speed command of causing the speed to be Vt after $\Delta t$ seconds to the ACC controller 14.

During the partially automated in-lane driving, a preceding vehicle ahead in the lane and traffic lane lines of the lane are recognized by the external sensor 21 to continuously monitor the vehicle itself to follow the generated target path.

Relation to the ACC, EPS, ESP/ABS, LKA and Engine Control

The ACC controller 14, the LKA controller 15, the EPS controller 31, the engine controller 32, and the ESP/ABS controller 33 are independently operable regardless of the automated steering, but are operable even by command input from the automated driving controller 10 during the operating of the partially automated in-lane driving function (PADS).

The ESP/ABS controller 33 having received a deceleration command from the ACC controller 14 outputs a hydraulic command to an actuator and controls a braking force of a brake 43, thereby controlling a vehicle speed. In addition, the engine controller 32 having received an acceleration/deceleration command from the ACC controller 14 controls actuator output (throttle opening degree), thereby giving a torque command to the engine 42 to control a driving force, and thereby controlling the vehicle speed.

The ACC function (ACCS) works in a combination of hardware of the millimeter wave radar 211 as the external sensor 21, the ACC controller 14, the engine controller 32, the ESP/ABS controller 33 and the like, and software.

That is, in a case in which there is no vehicle ahead, the constant speed drive is made by setting a cruising control set speed as a target speed, and in a case of having caught up with the vehicle ahead, (in a case in which a speed of the vehicle ahead is less than the cruising control set speed), the drive following the vehicle ahead is performed while keeping an inter-vehicle distance in accordance with a time gap (inter-vehicle time=inter-vehicle distance/speed of vehicle) set in line with the speed of the vehicle ahead.

The LKA function (LKAS) detects traffic lane lines and an own vehicle position by the environmental condition estimating part 11 of the automated driving controller 10 based on image data obtained in the external sensor 21 (cameras 212, 215) and performs steering control by the LKA controller 15 and the EPS controller 31 to be capable of travelling on the center of the lane.

That is, the EPS controller 31 in response to a steering command from the LKA controller 15 refers to a map of vehicle speed, steering angle and steering torque to output a torque command to an actuator (EPS motor), providing a front wheel steering angle as a target of the steering mechanism 41.

The partially automated in-lane driving function (PADS) is executed by a combination of the longitudinal control (speed control and inter-vehicle distance control) by the ACC controller 14 and the lateral control (steering control and lane keeping driving control) by the LKA controller 15, as described above.

Override Function

During the operating of the partially automated in-lane driving function (PADS), it is possible to override both of the longitudinal control system (ACCS) and the lateral control system (LKAS) by a driver.

The longitudinal control system (ACCS) is overridden in a case in which an engine torque request by an accelerator pedal operation of a driver or a deceleration request by a brake pedal operation is equal to or more than an override threshold of each other. Each of the override thresholds is set to an accelerator pedal operation amount (engine torque command value) or a brake pedal operation amount (ESP hydraulic command value) by which it is determined that a driver has performed an acceleration/deceleration operation with intent, and is also set in accordance with acceleration/deceleration characteristics and a driving condition of a vehicle.

That is, the ACC override stops the ACC control in a case in which an operation amount or an operation speed, by which it is determined that a driver has performed an acceleration pedal operation or a brake pedal operation with intent of acceleration or deceleration to the control vehicle speed, to an accelerator pedal or a brake pedal, and the vehicle transitions to a drive by the accelerator pedal operation and the brake pedal operation of a driver.

The lateral control system (LKAS) is overridden in a case in which the steering torque by the manual steering 34 of a driver is equal to or more than an override threshold. An override threshold by the steering intervention is set in accordance with steering characteristics and a driving condition of a vehicle.

That is, in a case of giving by the steering operation the steering torque by which it is determined that a driver has performed the steering with an intention of a route change or obstacle avoidance or has performed the steering (reverse steering) with an intention against the LKA control, the steering override stops the LKA control, and the vehicle transitions to a drive by the manual operation of a driver.

Transition to ACCS Fallback Control Mode at LKAS Function Failure Time

Incidentally in a case in which a LKAS function failure occurs due to a failure of the external sensor, abnormality of the EPS controller or the like during the operating of the partially automated in-lane driving function (PADS), the LKAS function is stopped at the same time with the failure occurrence and the ACCS transitions to the fallback control mode. In addition thereto, the ACC function stop and the operation takeover request are notified to a driver, and, after several seconds (for example, 4 seconds) elapse, the ACC fallback control is started and the target speed reaches a predetermined value, and at a point where the target deceleration rate reaches 0 m/s$^2$, the ACC function is stopped and the takeover of the accelerator pedal operation and the brake pedal operation is performed by a driver.

The ACC fallback control gradually reduces an acceleration/deceleration command value (vehicle speed command) to be input to the engine controller 32 to 0 km/h/s with a predetermined inclination and reduces a deceleration command value to be input to the ESP controller to 0 m/s$^2$ with a predetermined inclination. Thereby the setting is made at the aim of being capable of smoothly transitioning to the manual driving by the accelerator pedal operation and the brake pedal operation.

As described above, in a case in which the function failure of the LKAS occurs during the operating of the partially automated in-lane driving function, the ACC function and the LKA function are stopped, and the longitudinal control and the lateral control by these functions are taken over by a driver. However, at the time, the rapid deceleration or rapid acceleration behavior possibly occurs in a vehicle by the excessive operation override (ACC override) of the driver having panicked at the function stop/takeover request notification, which is as described above.

Excessive Operation Prevention Function at LKAS Function Failure Time

Therefore, the automated driving controller 10 according to the present invention includes an excessive operation prevention function that alters the ACC override threshold to a value greater than at a normal operation time in a period from partially automated in-lane driving function stop (LKA function stop/ACC function stop notification) to ACC function stop (for example, from 4 seconds after notification through ACC fallback control start to ACC fallback control end) at the time the function failure of the LKAS occurs at the operating of the partially automated in-lane driving function to perform the stop of the LKA function and the ACC function, and the takeover of the longitudinal control and the lateral control to a driver.

By making the ACC override threshold greater than at the normal operation time, at a LKAS function failure time, even when an operation amount so large as to possibly cause rapid acceleration/deceleration in a case of being prior to altering the threshold by the excessive accelerator pedal operation or brake pedal operation of a driver having panicked at the function failure notification, the ACC control continues to be performed without being in the override state. Therefore it is possible to restrict the rapid acceleration/deceleration of the vehicle to avoid rapidly approaching another vehicle, a lane departure, and induction of traffic flow confusion.

Accelerator Pedal Override Threshold at a Normal Operation Time

In a case in which an engine torque command value by depressing an accelerator pedal of a driver is greater than an engine torque command value for keeping an ACC setting speed (cruise setting speed or preceding vehicle following speed) or an ACC setting acceleration rate, the accelerator pedal operation of the driver is prioritized due to becoming the accelerator pedal override. The threshold is found by an engine torque map set in accordance with a vehicle speed and a gear ratio. An engine torque command value giving an acceleration rate equivalent to, for example, a speed 4 km/h to the ACC setting speed or an engine torque command value as an acceleration rate equivalent to 0.3 m/s$^2$ to the ACC setting acceleration rate is indicated at a threshold Td.

Brake Pedal Override Threshold at a Normal Operation Time

In a case in which an ESP hydraulic command as deceleration to an ACC setting speed (cruise setting speed or preceding vehicle following speed) or an ACC setting acceleration rate is given by depressing a brake pedal by a driver, the brake pedal operation of the driver is prioritized due to becoming the brake pedal override. The ESP hydraulic command value as deceleration equivalent to, for example, a speed 2 km/h to the ACC setting speed or the ESP hydraulic command value as a deceleration rate equivalent to 0.2 m/s$^2$ to the ACC setting acceleration rate is indicated at a threshold Pd.

Accelerator Pedal Override Threshold at LKAS Function Failure Time

The threshold is selected from a value greater than an ACC accelerator pedal override threshold at a normal time, preferably a range of 120% to 250% of the ACC accelerator pedal override threshold at the normal time, further preferably a range of 150% to 220%. For example, an engine torque command value giving acceleration equivalent to a speed 8 km/h to the ACC setting speed or an engine torque command value as an acceleration rate equivalent to 0.6 m/s$^2$ to the ACC setting acceleration rate is indicated at a threshold Te.

Brake Pedal Override Threshold at LKAS Function Failure Time

The threshold is selected from a value greater than an ACC brake pedal override threshold at a normal time, preferably a range of 120% to 250% of the ACC brake pedal override threshold at the normal time, further preferably a range of 150% to 220%. For example, an ESP hydraulic command value as deceleration equivalent to a speed 4 km/h to the ACC setting speed or an ESP hydraulic command value as a deceleration rate equivalent to 0.4 m/s$^2$ to the ACC setting acceleration rate is indicated at a threshold Pe.

Flow at LKAS Function Failure Time

Figure 4:
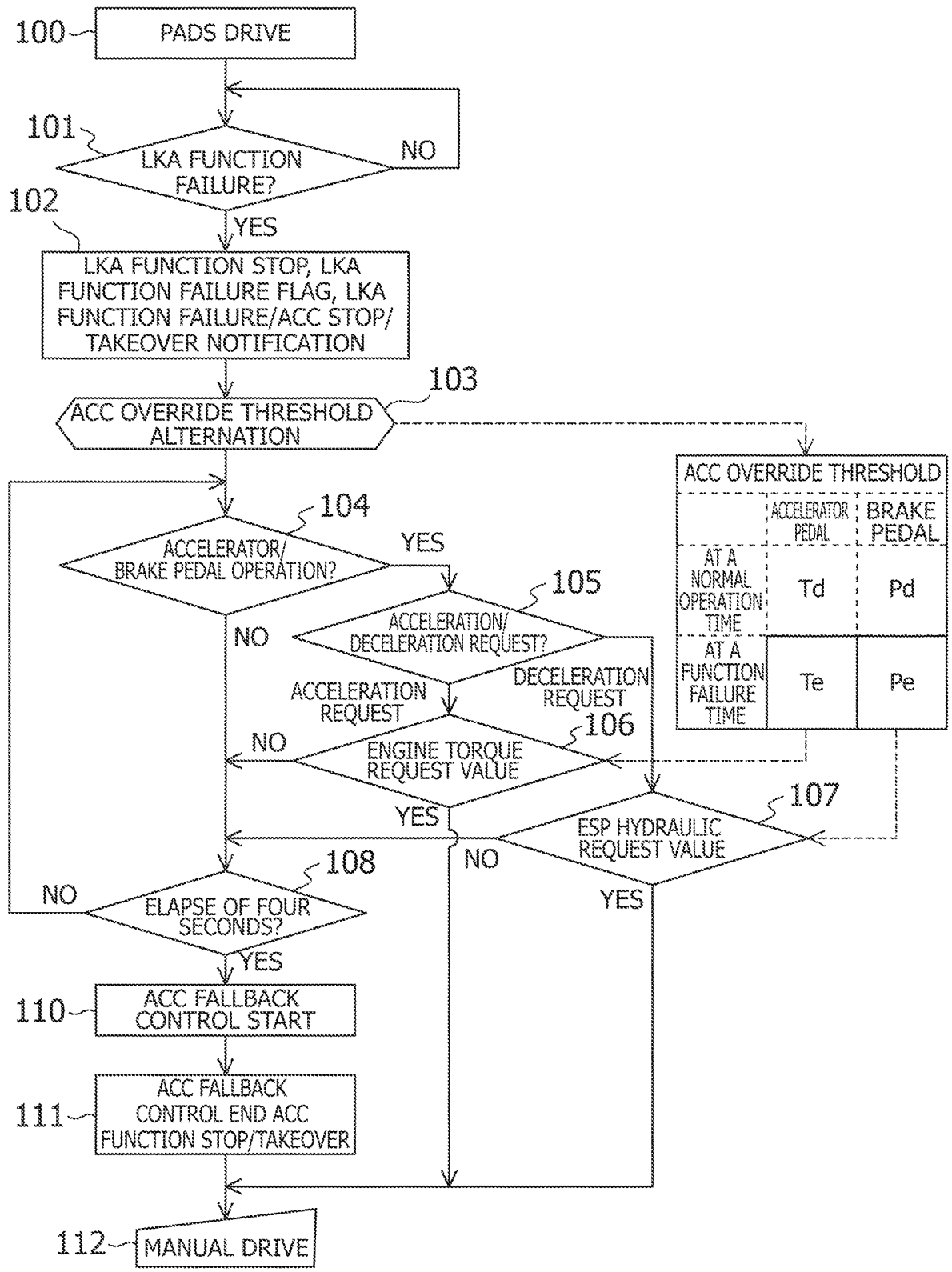
FIG. 4 is a flow chart illustrating an excessive operation prevention control at an LKA function failure time.

Next, an explanation will be made of a flow at an LKAS function failure time with reference to FIG. 4.

(1) Drive by the Partially Automated in-Lane Driving System (PADS Drive)

When a PADS drive is selected by an operation of a driver, the ACCS and the LKAS are activated via a system check, and being at the PADS drive is displayed in a meter panel or the like (step 100). In the PADS drive, the ACCS and the LKAS are co-operated to cause a constant speed drive of a vehicle while keeping the vehicle driving within a single lane at a target speed (cruise setting speed) or a following driving while keeping a predetermined inter-vehicle distance. In this case, an in-lane target path is set to a predetermined offset distance from a traffic lane line center or a left/right traffic lane line, or the like.

(2) LKAS Function Failure Determination

During the PADS (ACCS/LKAS) driving, failures or presence/absence of abnormality of components including the external sensor 21, the internal sensor 22 and the actuator group are always monitored to determine the function failure of the LKAS (step 101).

(3) LKA Function Stop

In a case in which failures of the components configuring the LKAS, such as a failure of the front detecting camera 212 configuring the external sensor 21 or a failure of the EPS controller 31 during the PADS (ACCS/LKAS) driving, the LKAS function is stopped immediately to rise an LKAS function failure flag (step 102).

(4) LKA Function Failure Notification, ACC Stop and Takeover Notification

Simultaneously occurrence of the LKAS function failure, and the ACC stop and the operation takeover are notified to a driver by a head-up display, a display within a meter panel or a voice. At the same time with this, a count of a predetermined time (for example, 4 seconds) until transitioning to the ACC fallback control is started.

(5) Alternation of ACC Override Threshold

Simultaneously an accelerator pedal override threshold Td and a brake pedal override threshold Pd of the ACC at a normal operation time are altered to an accelerator pedal override threshold Te (Te>Td) and a brake pedal override threshold Pe (Pe>Pd) at a function failure time (step 103).

For example, the ACC override threshold is altered from the ACC accelerator pedal override threshold Td (an engine torque command value giving acceleration equivalent to a speed 4 km/h to the ACC setting speed or an engine torque command value as an acceleration rate equivalent to 0.3 m/s$^2$ to the ACC setting acceleration rate) at the normal operation time to the ACC accelerator pedal override threshold Te (an engine torque command value giving acceleration equivalent to a speed 8 km/h to the ACC setting speed or an engine torque command value as an acceleration rate equivalent to 0.6 m/s$^2$ to the ACC setting acceleration rate) at the function failure time.

Simultaneously, the ACC override threshold is altered from the ACC brake pedal override threshold Pd (an ESP hydraulic command value as deceleration equivalent to a speed 2 km/h to the ACC setting speed or an ESP hydraulic command value as a deceleration rate equivalent to 0.2 m/s$^2$ to the ACC setting acceleration rate) at the normal operation time to the ACC brake pedal override threshold Pe (an ESP hydraulic command value as deceleration equivalent to a speed 4 km/h to the ACC setting speed or an ESP hydraulic command value as a deceleration rate equivalent to 0.4 m/s$^2$ to the ACC setting acceleration rate) at the function failure time.

(6) Determination on Presence/Absence of Accelerator/Brake Pedal Operation

At this point, the ACC is in the middle of operating, and presence/absence of the accelerator pedal operation or the brake pedal operation by a driver is determined by positioning sensors mounted on the accelerator pedal and the brake pedal (step 104).

(7) Determination on Acceleration/Deceleration Request

In a case in which an accelerator pedal operation or a brake pedal operation by a driver is detected, it is determined whether an override by the driver is an acceleration request or a deceleration request (step 105).

(8) Determination on Accelerator Pedal Override

In a case of the acceleration request, an engine torque command value by an accelerator pedal depression of a driver is compared with the override threshold Te (step 106).

i) In a case in which engine torque command value T>override threshold Te, the accelerator pedal override is determined, and immediately the override is performed to transition to a manual drive by an accelerator pedal operation and a brake pedal operation of a driver.

ii) In a case in which engine torque command value T≤Te, the override is not performed, and the ACC drive continues.

(9) Determination on Brake Pedal Override

In a case of the deceleration request, an ESP hydraulic command value by a brake pedal depression of a driver is compared with the override threshold Pe (step 107).

i) In a case in which ESP hydraulic command value P>Pe, the brake pedal override is determined, and immediately the override is performed to transition to a manual drive by an accelerator pedal operation and a brake pedal operation of a driver.

ii) In a case in which ESP hydraulic command value P≤Pe, the override is not performed, and the ACC drive continues.

(10) Determination on Takeover Elapse Time

In a case in which the ACC drive continues, a count of an elapse time from a point where the ACC takeover notification is outputted in the step 102 continues (step 108), and at a point where a predetermined time (for example, 4 seconds) elapses, the ACC fallback control is started (step 110).

(11) ACC Fallback Control End/ACC Function Stop/Operation Takeover

An acceleration/deceleration command value (vehicle speed command) to be input to the engine controller 32 is gradually lowered to 0 km/h/s with a predetermined inclination, and when the ACC fallback control lowering a deceleration command value to be input to the ESP controller 33 until 0 m/s$^2$ with a predetermined inclination ends, the ACC function is stopped and the operation takeover to a driver is performed (step 111) to completely transition to a manual drive by an accelerator pedal operation and a brake pedal operation of a driver (step 112).

Operation and Effect

As described in detail above, the driving control apparatus for the vehicle according to the present invention is configured such that while the stop of the LKA function and the ACC function and the takeover of the longitudinal control and the lateral control are notified to a driver to perform the fallback control of the ACC function at the function failure time of the LKAS, the ACC override threshold as the determination reference of the operation intervention stopping the ACC function is altered to the value greater than the ACC override threshold at the normal operation time of the LKA function. Therefore even in a case in which the driver having panicked at the LKA/ACC function stop and the operation takeover notification performs the excessive brake pedal operation or accelerator pedal operation, the override can be avoided to transition to the fallback control in a state in which the ACC function continues to be executed, and it is possible to prevent the approach to the other vehicle due to the ACC override by the excessive brake pedal operation or accelerator pedal operation, thus having an advantage upon performing the smooth operation takeover.

Figure 5:
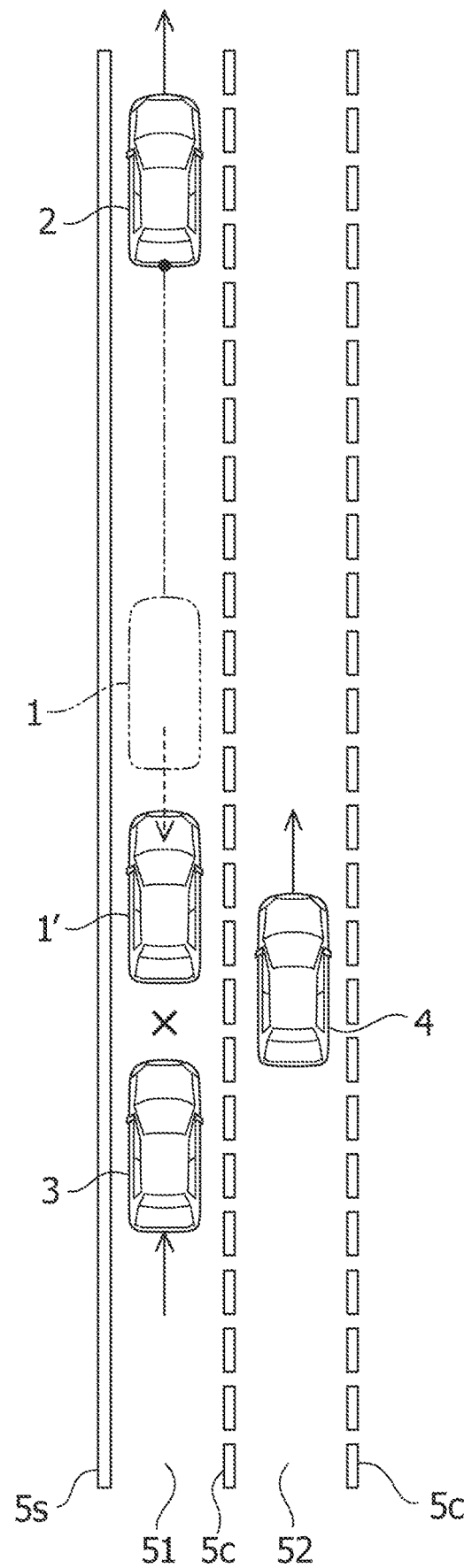
FIG. 5 is a schematic plan view exemplifying approach to another vehicle following an excessive brake pedal override at the LKA function failure time.

For example, in a case in which the driver having panicked at the LKA function stop and the ACC takeover request notification performs the excessive brake pedal operation, the brake pedal override of the ACC function is avoided, whereby, as illustrated in FIG. 5, the inter-vehicle distance to the preceding vehicle 2 is maintained by the ACC function to prevent the approach of the following vehicle 3.

Figure 6:
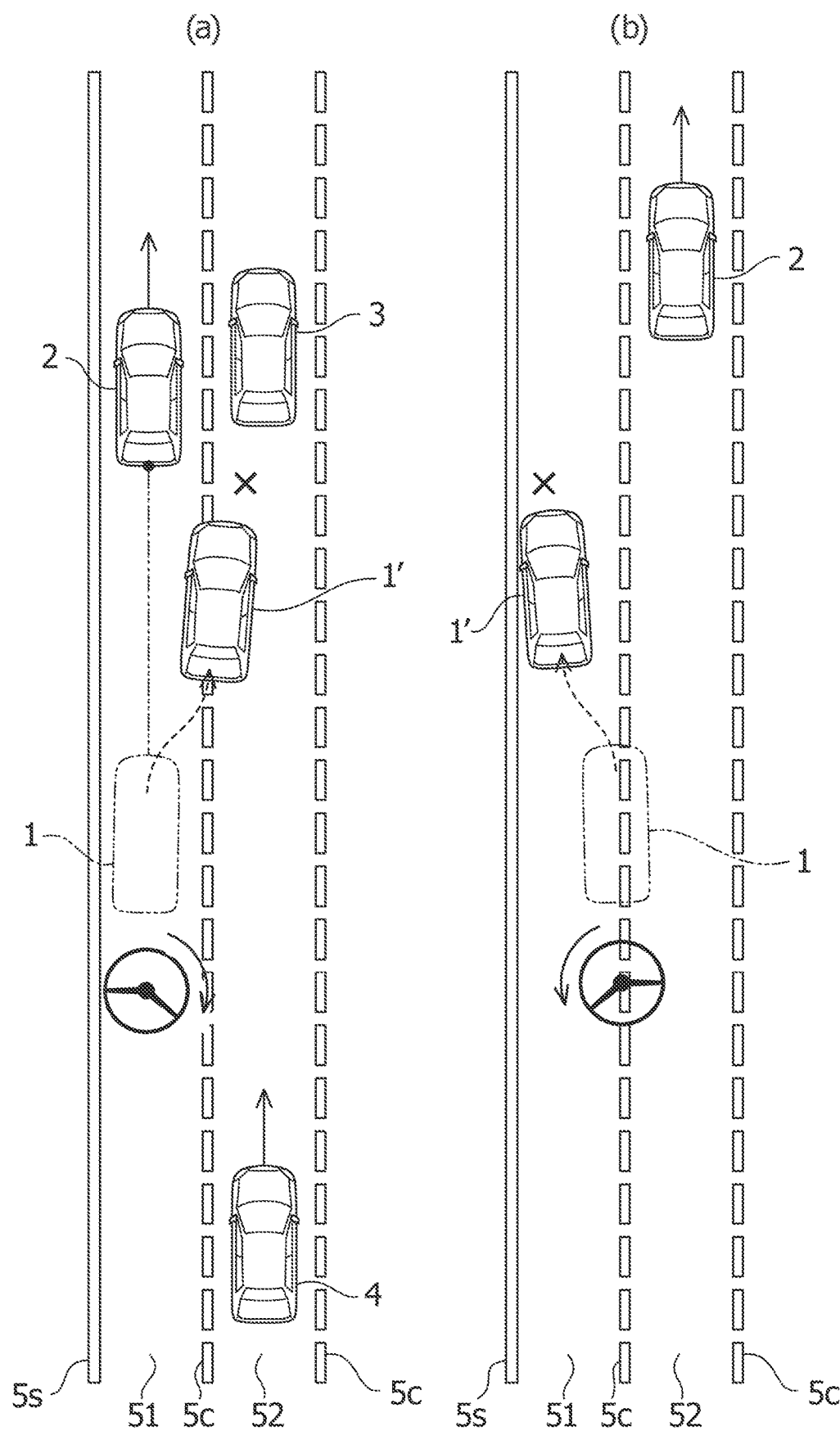
FIG. 6 is a schematic plan view exemplifying (a) approach to another vehicle or (b) lane departure following an excessive accelerator pedal override at the LKA function failure time.

In addition, as illustrated in FIG. 6(a), in a case in which the driver having panicked at the LKA function stop and the ACC takeover request notification performs the excessive accelerator pedal operation during the right automated steering for keeping in the lane, the accelerator pedal override of the ACC function is avoided, whereby the rapidly accelerated vehicle 1' can be prevented from approaching the neighboring lane 52. In addition, as illustrated in FIG. 6(b), in a case in which the driver having panicked at the LKA function stop and the ACC takeover request notification performs the excessive accelerator pedal operation during the left automated steering for keeping the lane, the accelerator pedal override of the ACC function is avoided, whereby the ACC setting speed is maintained to prevent the approach to the side strip, the side wall, the median zone or the like due to the rapid acceleration.

In addition, the ACC override threshold at the failure time of the LKA function is maintained from the stop of the LKA function and the ACC function and the notification of the operation takeover to the end of the fallback control. Therefore the operation takeover can be gradually done in a state in which the acceleration/deceleration control by the ACC function is partially acting, to perform the smooth steering takeover, and in addition thereto, by being back to the ACC override threshold at the normal time at a point where the ACC fallback control ends to transition to the manual drive, in a case in which the LKAS function recovers, it is possible to immediately operate the ACCS with the override threshold at the normal time.

Note that the embodiment describes a case in which the accelerator pedal override threshold is set based on the engine torque request by the accelerator pedal operation of the driver, but may be configured such that the accelerator pedal override threshold is set based on an accelerator pedal depressing amount or an accelerator pedal position of a driver.

Likewise, the embodiment describes a case in which the brake pedal override threshold is set based on the deceleration request by the brake pedal operation of the driver, but may be configured such that the brake pedal override threshold is set based on a brake pedal depressing amount or a brake pedal position of a driver.

As described above, descriptions are made of some of the embodiments of the present invention, but the present invention is not limited to the embodiments, and it can be additionally said that various modifications and changes are further made possible based on the technical concept of the present invention.

REFERENCE SIGNS LIST 1, 1' VEHICLE (VEHICLE ITSELF)
2, 3, 4 VEHICLE (OTHER VEHICLE)
10 AUTOMATED DRIVING CONTROLLER
11 ENVIRONMENTAL CONDITION ESTIMATING PART
12 PATH GENERATING PART
13 VEHICLE CONTROL PART
14 ACC CONTROLLER
15 LKA CONTROLLER
21 EXTERNAL SENSOR
22 INTERNAL SENSOR
31 EPS CONTROLLER
32 ENGINE CONTROLLER
33 ESP/ABS CONTROLLER
34 MANUAL STEERING (STEERING)
41 STEERING MECHANISM
42 ENGINE
43 BRAKE
51, 52 LANE

The invention claimed is:

1. A driving control apparatus for a vehicle, comprising:
an environmental condition estimating part including a surrounding recognizing function that recognizes a vehicle's driving lane and another vehicle driving in the driving lane and a function that obtains the vehicle's moving state;
a path generating part that generates a target path based on information obtained by the environmental condition estimating part; and
a vehicle control part that performs speed control and steering control for causing the vehicle to follow the target path, and configured to be capable of executing:
an ACC function that performs a constant speed drive in accordance with a target speed in a case in which another vehicle which is ahead is not present in the vehicle's driving lane and performs a following drive while keeping a predetermined inter-vehicle distance in a case in which the vehicle ahead is present;
an LKA function that keeps the driving within the vehicle's driving lane by the following control to the target path;
an override function that stops the ACC function by operation intervention of a driver; and
a function that performs fallback control of the ACC function by notifying stop of the ACC function and an operation takeover to the driver at a failure time of the LKA function, the fallback control including gradually reducing the ACC function,
wherein when the failure of the LKA function is detected, an ACC override threshold as a determination reference of the operation intervention stopping the ACC function is set to a second value greater than a first value at a normal operation time of the LKA function.

2. The driving control apparatus for the vehicle according to claim 1, wherein the second value of the ACC override threshold at the failure time of the LKA function is maintained from the notification of the stop of the ACC function and the operation takeover to an end of the fallback control, and when the fallback control is finished, the ACC override threshold of the LKA function is set back to the first value.

3. The driving control apparatus for a vehicle, according to claim 1, wherein the environmental condition estimating part monitors failures or presence/absence of abnormality of components including an external sensor, an internal sensor, an electric power steering controller, and an actuator group, and when the failure or abnormality is detected, decides the LKA function has the failure.

* * * * *